US011829382B2

(12) United States Patent
Ben-Yehuda et al.

(10) Patent No.: US 11,829,382 B2
(45) Date of Patent: Nov. 28, 2023

(54) REPLICATION FOR SNAPSHOT REVERSION

(71) Applicant: VAST DATA LTD., Tel Aviv (IL)

(72) Inventors: Ohad Ben-Yehuda, Tel Aviv (IL); Uri Weissbrem, Tel Aviv (IL); Oren Ashkenazi, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 313 days.

(21) Appl. No.: 17/445,190

(22) Filed: Aug. 16, 2021

(65) Prior Publication Data

US 2022/0342905 A1    Oct. 27, 2022

Related U.S. Application Data

(63) Continuation-in-part of application No. 17/302,129, filed on Apr. 23, 2021, now Pat. No. 11,726,881.

(51) Int. Cl.
*G06F 16/27* (2019.01)
*G06F 11/14* (2006.01)

(52) U.S. Cl.
CPC .......... *G06F 16/27* (2019.01); *G06F 11/1469* (2013.01); *G06F 2201/84* (2013.01)

(58) Field of Classification Search
None
See application file for complete search history.

(56) References Cited

U.S. PATENT DOCUMENTS

| | | | | |
|---|---|---|---|---|
| 6,161,193 A * | 12/2000 | Garg | ................... | G06F 11/1492 714/E11.13 |
| 9,558,085 B2 * | 1/2017 | Lakshman | .......... | G06F 11/2094 |
| 10,769,103 B1 | 9/2020 | Patwardhan et al. | | |
| 11,086,545 B1 * | 8/2021 | Dayal | ..................... | G06F 3/067 |
| 2016/0314046 A1 | 10/2016 | Kumarasamy | | |
| 2019/0227877 A1 * | 7/2019 | Pandey | ................. | G06F 16/128 |
| 2020/0349029 A1 * | 11/2020 | Meadowcroft | ..... | G06F 11/1466 |

* cited by examiner

*Primary Examiner* — Eddy Cheung
(74) *Attorney, Agent, or Firm* — Reches Patents

(57) ABSTRACT

A method for snapshot reversion, the method may include initializing a recovery of a storage system, from a failure that stopped a replication of a failed replication snapshot to an other storage system; wherein the other storage system reverted to an older snapshot not stored in the storage system; and reverting to the older snapshot, by the storage system using older snapshot metadata and data received from the storage system; wherein the older snapshot data may include a non-existing indication for a snapshot segment that existed in a snapshot that followed the older snapshot and not exists at the older snapshot, and wherein the data may include one or more older snapshot segments; wherein the reverting to the older snapshot is executed without undoing changes that were made since the older snapshot.

15 Claims, 11 Drawing Sheets

| | | | |
|---|---|---|---|
| 540(1) | Address range 541(1) | Time Marker 542(1) | Pointer to data 543(1) |
| 540(2) | Address range 541(2) | Time Marker 542(2) | Pointer to data 543(2) |
| 540(n) | Address range 541(n) | Time Marker 542(n) | Pointer to data 543(n) |

REPLICATION FOR SNAPSHOT REVERSION

TECHNICAL FIELD

The present disclosure generally relates to the field of data storage, and more particularly to a replication that involves snapshot reversion.

BACKGROUND

Replication is a process for copying production data from a primary storage system to a secondary storage system at a remote location for data protection or disaster recovery purposes. The replication may use snapshots for marking synchronized points in time, where the synchronized version is reflected by snapshots taken on both primary and secondary sites, and having the same snapshot identifier.

A primary storage system may store less snapshots than a secondary storage system, for example, when the primary storage is the production system and the secondary is the backup system. The primary storage system may replicate snapshots to the secondary storage system.

A replication cycle can fail before being completed because of a failure of the primary storage system, the secondary storage system, or the connection between the two systems.

When the primary storage fails, a failover process takes place where the secondary storage system may become the active storage system. When the primary storage system is restored a failback process takes place and involves synchronizing the primary system.

Recovering from data corruption can be handled by reverting the working version to an older version by restoring an older snapshot over the working version.

When one of the storage systems decide to revert to a previous version, synchronizing the other system, can be more complicated than synchronizing to the current version upon a failback process.

SUMMARY

There may be provide a storage system, a method and a non-transitory computer readable medium for a replication that involves snapshot reverting.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 1B illustrates an example of an extent mapping structure.

DETAILED DESCRIPTION

Figure 1A:
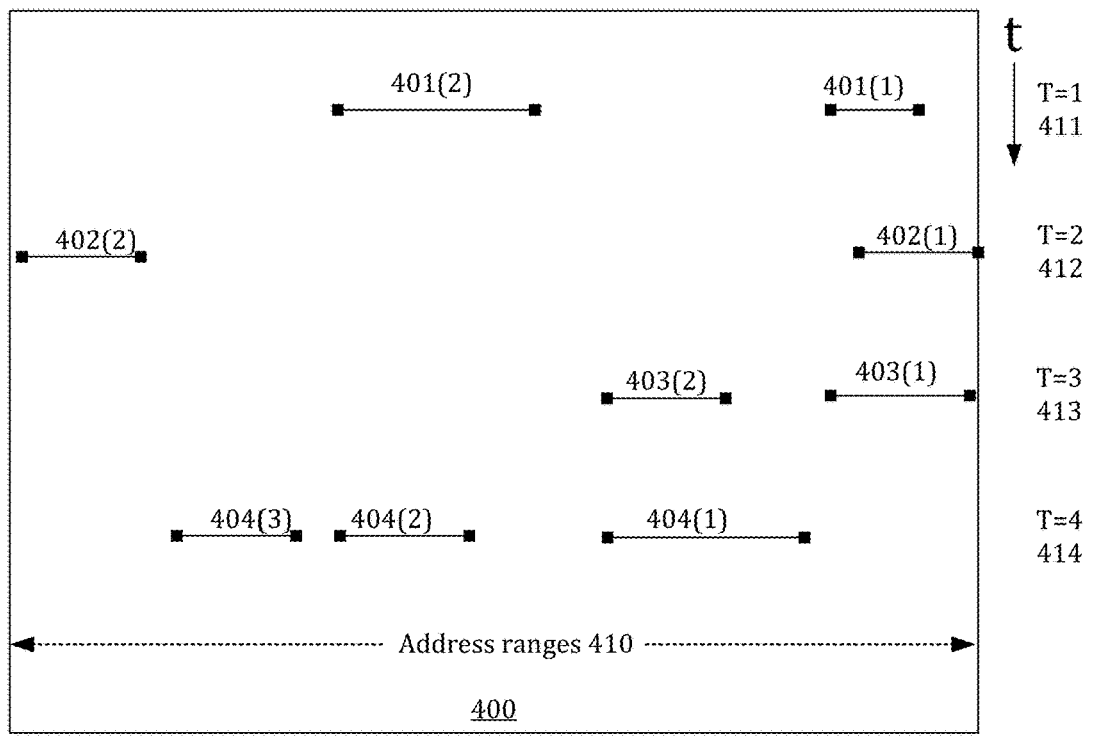
FIG. 1A illustrates an example of an extent mapping.
Figure 1A:
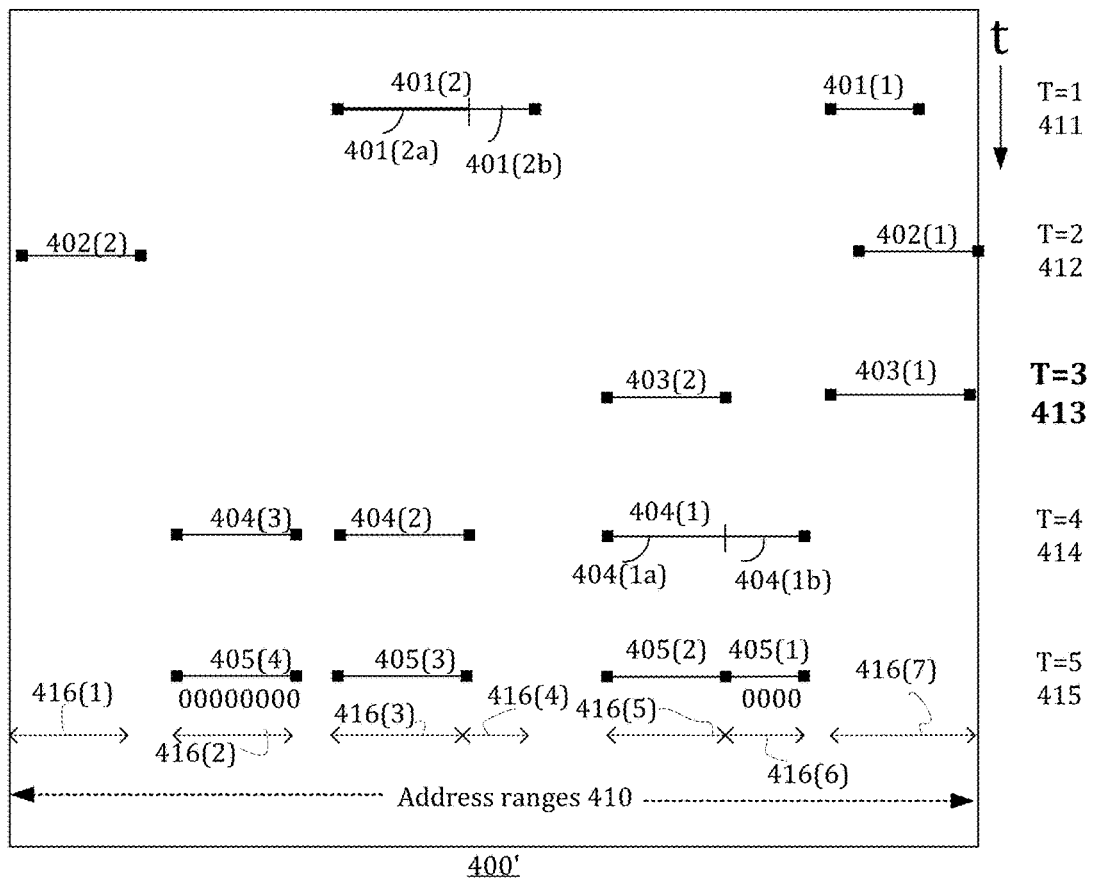

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a compute core. The compute core can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

The present system and method allow reverting a current working version of a filesystem entity, to provide a reconstructed version of the filesystem entity that reflects an earlier version (fallback version), without undoing changes that were made since the fallback version, and preserving the ability to access intermediate versions, i.e., updates that were made between the earlier version and the current working version.

The earlier version to be adapted is referred herein as "rollback version" or "fallback version". The working version is the current version of the filesystem (or a portion of the filesystem) upon which ongoing write requests are performed.

The storage system handles timelines, which are used for creating time markers representing points in time, being used for marking data of extents written to the filesystem.

The time markers are assigned to extents by utilizing timeline values of a global time counter that is consistent across all compute nodes of the storage system. The global time counter may be updated periodically and is saved in one or more storage nodes that are accessible to all the compute nodes.

The following example refer to extents and portions of extents. Both are examples of segments of a file system entity.

Each extent, when being written to is marked with a time marker that reflects the timeline (i.e., the value of the global time counter) that was in force at the time of writing to the extent. Extents that are marked with a certain time marker that indicates a certain timeline, were written during a time period that started when the global time counter indicated the certain timeline and ended when the global time counter was incremented to a next timeline. Some of the timelines may be defined as snapshots, so as to freeze the state of these timelines.

Suppose a problem is detected in a working version. The problem may be related to a target of a replicated version of the working version, where the replication failed in a middle of a replication cycle, and there is a need to roll back to a consistent version that existed when the current replication started. As for another example, suppose a virus was detected in the working version (or any other data corruption) and there is a need to roll back to a previous version that precedes the virus attack (or a previous version with no data corruption).

When a problem is detected in the working version, a process of reverting to a certain previous version takes place. The certain previous version is referred to as the rollback version, and is associated with a rollback version time marker, that identifies a certain timeline, referred to as a rollback version timeline.

The reverting process may be reverting of a file system entity (a whole filesystem, file, directory, object, bucket), by writing on top the working version, data and/or metadata that reflect the state of the content of the filesystem entity, at the time of the rollback version, and thereby providing a reconstructed version, that will be the current version upon which new ongoing writes will be performed. The reverting process includes examining extents that were written at the timeline of the rollback version, extents that were written since the rollback version (between the timeline of the rollback version and the current working version), and extents that were written before the rollback version.

The extents that belong to the rollback version (i.e., marked with the rollback version time marker, or extents marked with earlier time markers and were not overwritten until and including the rollback timeline) and were overwritten upon later timelines, are applied on top of the working (current) version (to provide the reconstructed version), as if requested to be written to the filesystem during the current timeline.

Extents that were written for the first time (since the filesystem entity was created) after the rollback timeline, are invalidated. The address ranges of these extents are being associated with values that indicate non-written extents.

FIG. 1A illustrates a graphical presentation of an extent mapping 400 of a certain filesystem entity, at a current time when T=4, logging four timelines 411-414 (T1-T4). The filesystem entity occupies address range 410, that may indicate offsets within the filesystem entity or may be absolute addresses occupied by the filesystem entity. An extent mapping includes address ranges (extents) of written data (illustrated as lines with square ends) and the corresponding time markers.

The address range 410 may include multiple address sub-ranges such as first till seventh address ranges 416(1)-416(7).

The extent mapping 400 indicates that at time T=1 411 two extents 401(1) and 401(2) were written to the certain filesystem entity, at time T=2 412 two extents 402(1) and 402(2) were written, at time T=3 413 two extents 403(1) and 403(2) were written, and at time T=4 414 three extents 404(1)-404(3) were written.

For the sake of simplicity, the following examples refer to a file as an example of a filesystem entity, however the filesystem entity may be a whole filesystem or any portion of a filesystem such as: a directory along with all the underlying files and directories including the content of the sub-directories. The filesystem entity may be an object or a bucket of objects.

Referring to a third version of the file that corresponds to the state of the file at timeline T=3. The third version is composed of every extent that was written during the timeline of T=3, and every extent that was written prior to T=3 and was not overwritten at any later timeline. In the example of FIG. 1, the third version of the file is composed of: extents 403(1) and 403(2) that were written during timeline T=3; as well as extent 401(2) that was written in T=1 and was not overwritten by version T=3 or any version after than T=1 that preceded version T=3; and extent 402(2) that was written in T=2 and was not overwritten since.

At time T=5, it is decided to revert to the version of T=3. The version of T=3 is the rollback version.

An extent mapping 400' reflects the status of the certain filesystem entity after the completion of the revert process.

The process of reverting includes: (i) applying, on top of the working version, content of extents that belong to version T=3 and were overwritten by later versions, in this case, the version that corresponds to T=4. The meaning of "applying" is: manipulating metadata (pointers) so as to obtain the effect of rewriting these extents; and (ii) Annulling, in this version, extents that were written in later versions (e.g., T=4) that succeed the rollback version, and were never written by any previous versions, until and including the rollback version.

For example, extent 403(2) needs to be rewritten, because it was overwritten by extent 404(1). Therefore, the content of extent 403(2) is applied on top of the working version so as to obtain extent 405(2), in extent mapping 400'. The content of extent 405(2) is the same as the content of extent 403(2). In the same manner, a portion 401(2a) of extent 401(2) that was written during T=1 is also applied on the working version, as reflected by extent 405(3), because it was overwritten by extent 404(2) of version T=4.

Extents of the rollback version that were not overwritten by succeeding versions, are not applied on the working version, for example extents 403(1), 402(2) and a portion 401(2b) of extent 401(2).

Extents that were written during timeline T=4, and did not exist in timeline T=3, i.e., were never written before or during T=3, need to be annulled, i.e., to indicate that these extents were never written to. For example, extent 404(3) that was written in T=4, was never written to the file during or before the rollback timeline, and therefore is annulled, as reflected by extent 405(4). In addition, a portion 404(1b) of extent 404(1) covers an address range that was never belong to version T=3, and therefore is annulled, as reflected by extent 405(1).

None of the extents of the versions that succeed the rollback version are deleted, so that the data that was written after the rollback timeline can be access, in the same manner as any access made to a previous version or to a snapshot.

FIG. 1B illustrates an embodiment of an extent mapping structure 540 of at least a portion of a file. A file may be associated with multiple extent mapping structures.

Each entry 540(1)-540(n) includes: (i) the address range 541 of the extent, which may be expressed as an offset from the beginning of the file and a size, or by any other address range characteristics; (ii) the time marker 542 that indicates the timeline of the writing; (iii) a data pointer 543 that points to the stored data of the extent.

When applying, on the working version, content of extents that belong to the rollback version: a new entry is added to extent mapping 540 of the file, with the same data pointer as the equivalent extent from the rollback version. The time marker is set to the current timeline, e.g., T=5. The address range may be the same address range of the corresponding extent of the rollback version, or a subset of the address range. For example, extent 405(2) has the same address range as extent 403(2), while extent 405(3) has an address range that is a subset of the address range of extent 401(2).

When annulling an extent of the version that succeeds the rollback version, a new extent is added to extent mapping 540 of the file, with the same address range of the annulled extent or a subset of the annulled extent. The time marker is set to the current timeline. The data pointer is set to null to indicate an annulled extent, or otherwise, any other indication can be set for indicating that this extent has no data.

When a revert process is executed, all the extent mapping structures of the file are scanned, and the extents of the rollback version are compared to extents of succeeding versions, so as to determine which extents, or portions thereof, are needed to be annulled or to be overwritten, i.e., applying content of the rollback version.

Figure 1C:
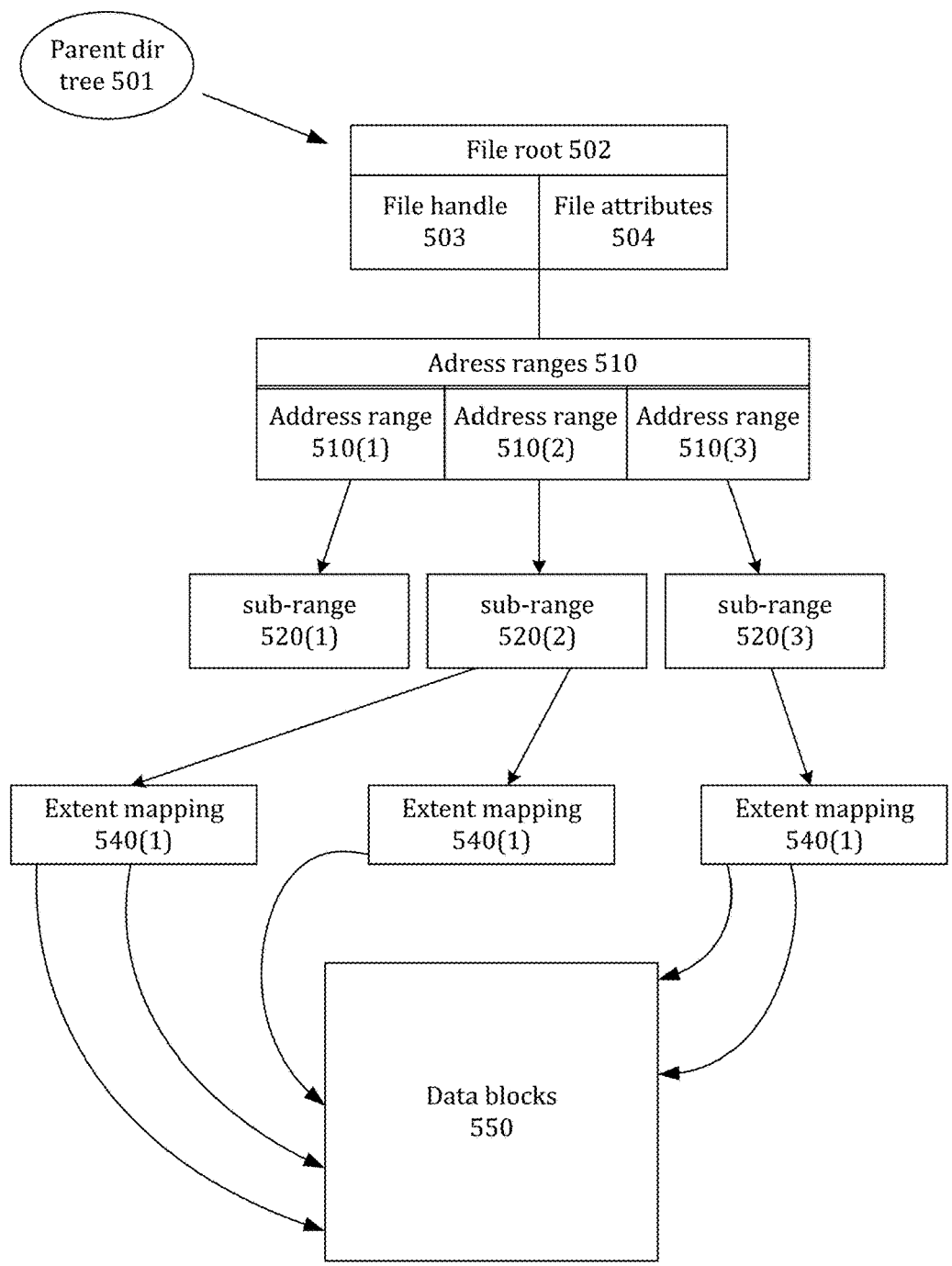
FIG. 1C illustrates an example of metadata a structure.

FIG. 1C illustrates a metadata structure for mapping a filesystem entity, e.g., a file. In this example, the mapping of the file is implemented as a mapping tree 500. Tree 500 is pointed by a similar mapping tree 501 of the file's parent directory.

A root 502 of mapping tree 500 includes the file's attributes 504 and handle 503. Mapping tree 500 includes one or more hierarchies for mapping address ranges, such as address ranges 510 and sub-address ranges 520. Each address range block or sub-address range block may point to one or more extent mapping blocks 540, such blocks 540 (1)-540(3). An extent mapping blocks 540 is further described in FIG. 1C. Data blocks 550 are the actual stored data, pointed by the extent mapping blocks.

When a revert process of the file is executed, all the extent mapping blocks of the mapping metadata are scanned and updated with new entries for obtaining the updated working (reconstructed) version that reflects the image of the file as of the rollback version.

Each directory is associated with a similar mapping tree, but instead of mapping address ranges it maps name ranges, and instead of having extent mapping blocks it includes name mapping blocks, where each name (either filename or a directory-name) is associated with a pointer to a similar metadata tree of a sub-directory or a file.

When the revert process refers to a filesystem entity that is a certain directory, all the mapping trees of the directories and files descendant from the certain directory are scanned to apply the rollback version on extents added to the current version.

Figure 1D:
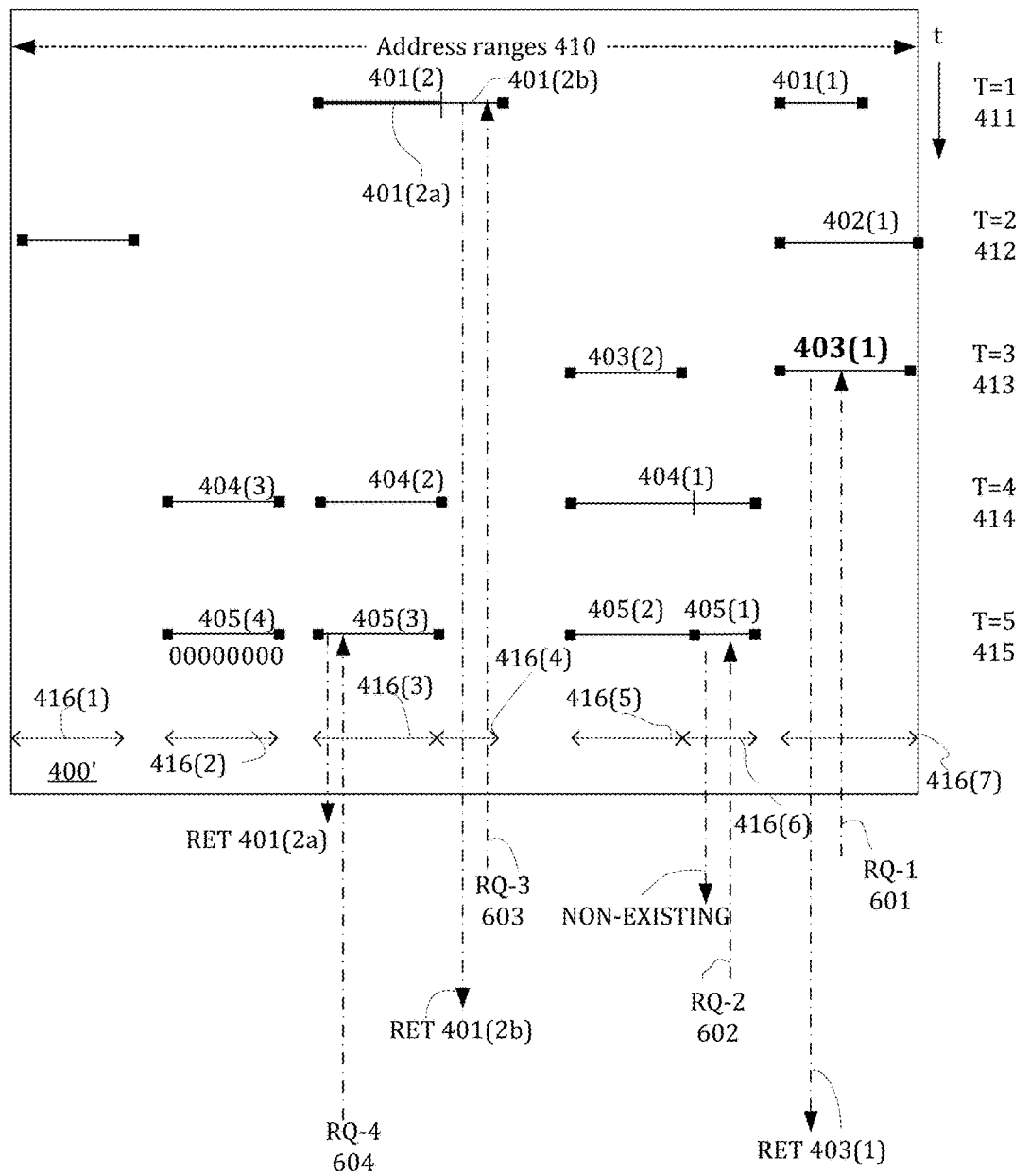
FIG. 1D illustrates example of requests and responses related to an extent mapping.

FIG. 1D illustrates requests and responses related to extent mapping 400'.

First request RQ-1 601 is aimed to seventh address sub-range 416(7)—in which there is no intermediate extent but there is an extent of the fallback version—403(1)—so that the response is retrieval metadata for retrieving extent 403(1).

Second request RQ-2 602 is aimed to a sixth address sub-range 416(6)—in which the only extent belongs to the intermediate version—and thus a non-existing indication is provided as an answer.

Third request RQ-3 603 is aimed to fourth address sub-range 416(4)—in which there is no intermediate extent and no extent of the fallback version—and the last extent portion that does not exceed the fall back version is 401(2b)—so that the response is retrieval metadata for retrieving extent portion 401(2b).

Fourth request RQ-4 604 is aimed to a third address sub-range 416(3)—in which there is intermediate extract 404(2) but there is a last extract portion that does not exceed the fall back version that is 401(2a). The response is retrieval metadata for retrieving extract portion 401(2a).

As illustrated in this FIGURE—neither one of the responses include retrieval information for retrieving any of the extents of the intermediate version of T=4.

Figure 2:
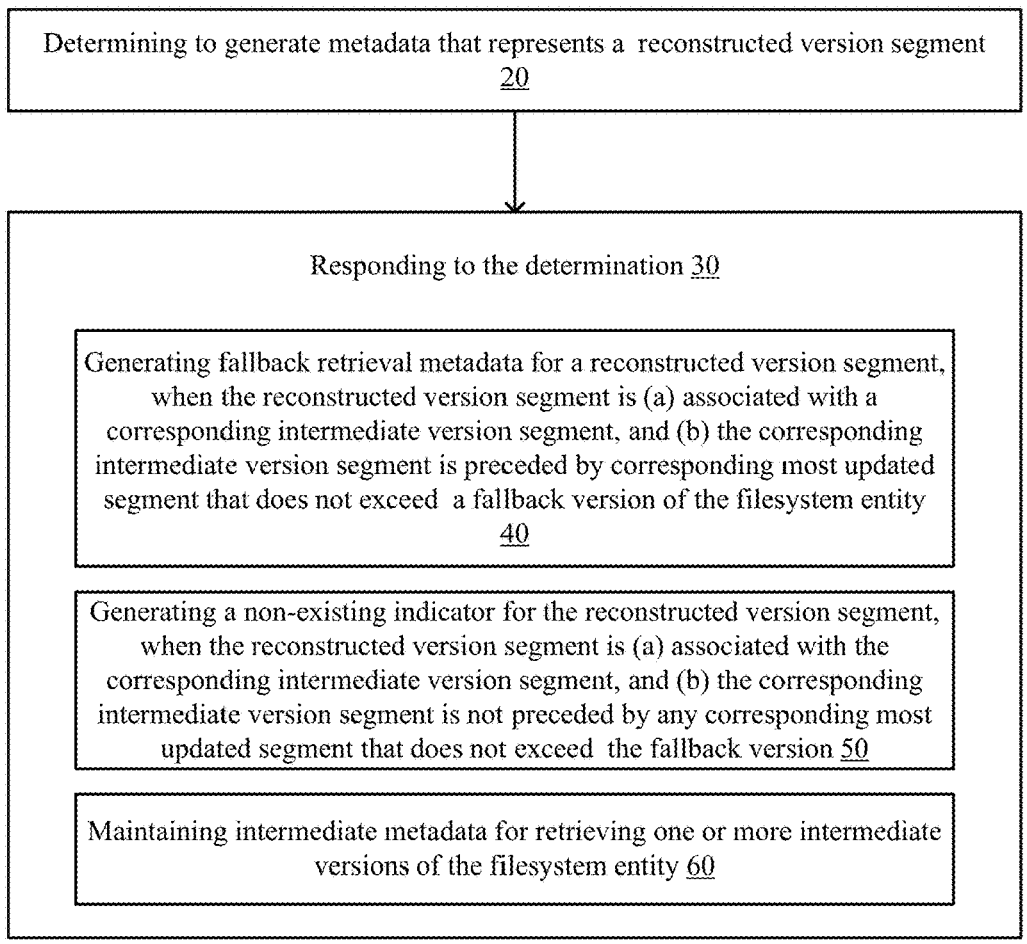
FIG. 2 illustrates an example of a method.
Figure 2:
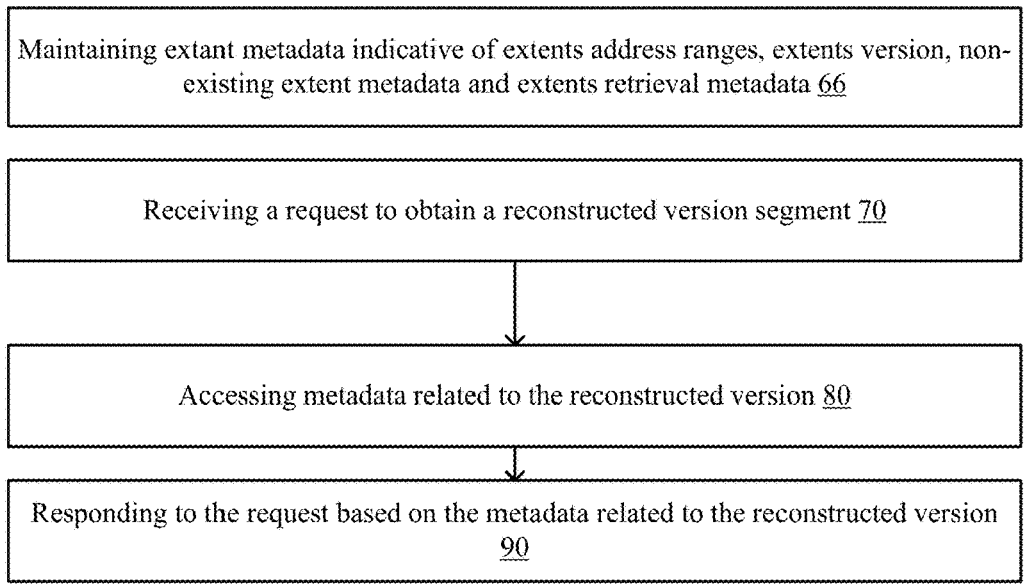

FIG. 2 illustrates method 10.

Method 10 is for generating a reconstructed version of a filesystem entity.

Method 10 may start by step 20.

Step 20 may include determining to generate metadata that represents a reconstructed version segment.

Step 20 may be followed by step 30 of responding to the determination.

Step 30 may include steps 40, 50 and 60.

Step 40 may include generating fallback retrieval metadata for a reconstructed version segment, when the reconstructed version segment is (a) associated with a corresponding intermediate version segment, and (b) the corresponding intermediate version segment is preceded by corresponding most updated segment that does not exceed a fallback version of the filesystem entity. Most updated segment till a fallback version may include any extent or a portion thereof that was written on or before the fallback timeline and was not overwritten by a later version up to and including the fallback version, for example: extent 403(1) that was written on timeline T=3 of the fallback version, or 401(2a) that was written on timeline T=1, and was not overwritten by a later version, but only by the intermediate version.

The term "corresponding" refers to a sharing of an address sub-range. The reconstructed version segment, the corresponding intermediate version segment and the corresponding most updated segment that does not exceed a fallback version have a same address sub-range.

The corresponding intermediate segment belongs an intermediate version of the filesystem entity. The intermediate version is generated between a fallback point of time of the fallback version of the of the filesystem entity and a reconstruction point of time of the reconstructed version of the filesystem entity. More than one intermediate version may exist and steps 40 and 50 may be performed for any non-overlapping segments of all the intermediate versions.

Step 50 may include generating a non-existing indicator for the reconstructed version segment, when the reconstructed version segment is (a) associated with the corresponding intermediate version segment, and (b) the corresponding intermediate version segment is not preceded by any corresponding most updated segment that does not exceed the fallback version. A non-existing indicator may be metadata indicating that a certain address sub-range does not include data, e.g., segment 405(4).

Step 60 may include maintaining intermediate metadata for retrieving one or more intermediate versions of the filesystem entity.

A reconstructed version segment may include one or more portions of an extent.

The generating of the fallback retrieval metadata may include generating retrieval information for retrieving the most updated segment that does not exceed a fallback version of the filesystem entity.

Step 30 may be repeated for generating fallback retrieval metadata and nonexisting indicators for multiple reconstructed version segments. For example—for each one of the seven address sub-ranges.

Method 10 may also include step 60 of maintaining extent metadata indicative of extents address ranges, extents version, non-existing extent metadata and extents retrieval metadata. See, for example, the data structures of FIGS. 1B and/or 1C.

Method 10 may also include step 70 of receiving a request to obtain a reconstructed version segment.

Step 70 may be followed by step 80 of accessing metadata related to the reconstructed version. Step 80 may be performed in response to an IO request for accessing the current version of the filesystem entity (while the reconstructed version is not succeeded by other versions) or in response to an IO request for accessing the reconstructed version of the filesystem entity, indicated by the version identifier (e.g., T=5).

Step 80 may be followed by step 90 of responding to the request based on the metadata related to the reconstructed version.

Figure 3A:
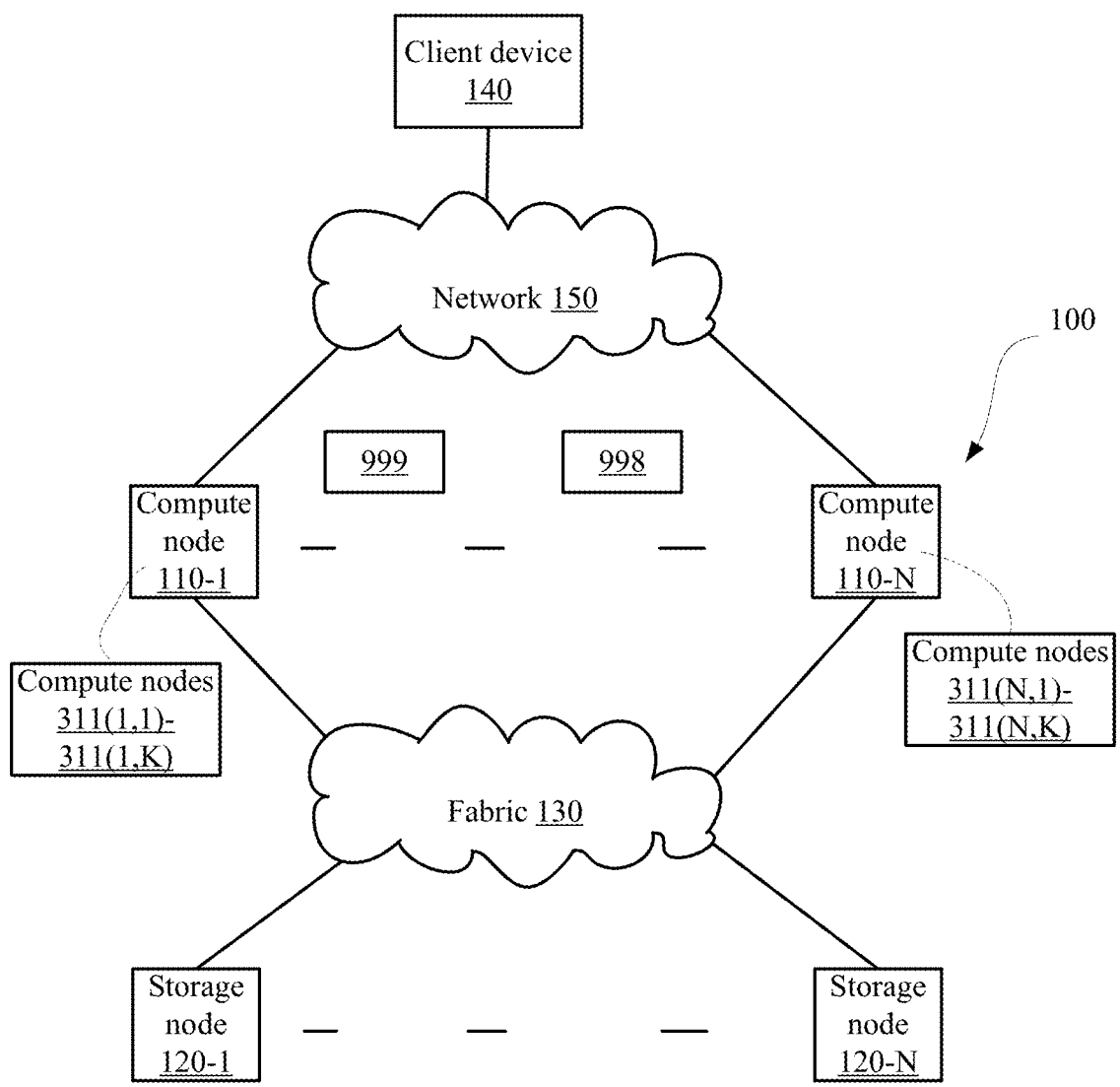
FIG. 3A is an example of a storage system.

FIG. 3A shows an example diagram of a storage system 100 according to the disclosed embodiments.

The storage system 100 includes a number of N compute nodes 110-1 through 110-N (hereinafter referred to individually as a compute node 110 and collectively as compute nodes 110, merely for simplicity purposes, N is an integer equal to or greater than 1). The compute nodes include (or may execute) multiple compute cores each—see for example compute nodes 311(1,1)-311(1,K) and compute nodes 311(N,1)-311(N,K). Storage system 100 may act as a primary storage system or as a secondary system (also referred to as the other system) in the process of replication.

The storage system 100 also includes a number of M storage nodes storage node 120-1 through 120-M (hereinafter referred to individually as a storage node 120 and collectively as storage nodes 120, merely for simplicity purposes, M is an integer equal to or greater than 1). The computer nodes 110 and the storage nodes 120 are connected through a communication fabric 130. M may equal N or may differ from N.

In an embodiment, a compute node 110 may be realized as a physical machine or a virtual machine. A physical machine may include a computer, a sever, and the like. A virtual machine may include any virtualized computing instance (executed over a computing hardware), such as a virtual machine, a software container, and the like.

It should be noted that in both configurations (physical or virtual), the compute node 110 does not require any dedicated hardware. An example arrangement of a compute node 110 is provided in FIG. 3D.

A compute node 110 is configured to perform tasks related to the management of the storage nodes 120. In an embodiment, each compute node 110 interfaces with a client device 140 (or an application installed therein) via a network 150. To this end, a compute node 110 is configured to receive requests (e.g., read or write requests) and promptly serve these requests in a persistent manner. The network 150 may be, but is not limited to, the Internet, the world-wide-web (WWW), a local area network (LAN), a wide area network (WAN), and the like.

In an embodiment, a compute node 110 is configured to interface with different protocols implemented by the client devices or applications (e.g., TCP/IP, HTTP, FTP, etc.) and to manage the read and write operations to the storage nodes 120. The compute node 110 is further configured to translate the protocol commands into a unified structure (or language). Then, each compute node 110 is also configured to logically address and map all elements stored in the storage nodes 120.

Further, each compute node 110 may maintain the logical operations of elements and the relationships between the elements (for example, directory trees) and an element attribute (e.g., metadata) via state stored on the storage nodes 120. An element may include a file, a directory, an object, and the like. The mapping and addressing of the elements allow the compute node 110 to maintain the exact physical locations of the elements in the storage nodes 120.

In an embodiment, to efficiently read and write data to the storage nodes 120 from the physical layer, each compute node 110 performs a number of processes including data reduction, data resiliency, and Flash memory management actions (e.g., defrag, wear leveling, and so on).

It should be noted that each compute node 110 may operate in the same manner as all other compute nodes 110. In a case of a failure, any compute node 110 can replace the failed node. Further, each compute node may control and manage one or mode storage nodes 120 regardless of the specific architecture of the storage nodes 120. Therefore, there is no coupling between specific compute nodes 110 and specific storage nodes 120. As such, compute nodes can be added to the system 100 without increasing the number of storage nodes (or their capacity), and vice versa, storage nodes can be added without increasing the number of compute nodes 110.

The storage nodes 120 provide the storage and state in the system 100. To this end, each storage node 120 may include a plurality of SSDs which may be relatively inexpensive.

The storage nodes 120 may be configured to have the same capacity as each other or different capacities from each other. In an embodiment, the data stored in each storage node 120 is made redundant internally within the storage node, made redundant at a different storage node, or both. As will be discussed below with reference to FIGS. 3C and 3D, each storage node 120 further includes a non-volatile random-access memory (NVRAM) and an interface module for interfacing with the compute nodes 110.

A storage node 120 may be configured to communicate with the compute nodes 110 over the communication fabric 130. It should be noted that each compute node 110 can communicate with each storage node 120 over the communication fabric 130. There may not be a direct coupling between a compute node 110 and storage node 120.

In the embodiment, the communication fabric 130 may include an Ethernet fabric, an InfiniBand fabric, and the like. Specifically, the communication fabric 130 may enable communication protocols such as, but not limited to, remote direct memory access (RDMA) over Converged Ethernet (RoCE), iWARP, Non-Volatile Memory Express (NVMe), and the like. It should be noted that the communication protocols discussed herein are provided merely for example purposes, and that other communication protocols may be equally utilized in accordance with the embodiments disclosed herein without departing from the scope of the disclosure.

It should be noted that in one example deployment, the client device 140 is part of a computer node 110. In such a deployment, the system 100 does not communicate with an external network, e.g., the network 150. It should be further noted that the communication between the compute nodes 110 and the storage nodes 120 is always facilitated over the fabric 130. It should be further noted that the compute nodes 120 can communicate with each other over the fabric 130. The fabric 130 is a shared fabric.

FIG. 3A also illustrates a load monitor 998 and a load balancer 999. The load balancer 999 and the load monitor 998 may be included in one of the compute nodes, may be located outside any of the compute nodes, may be combined, may include one or more compute cores, may be executed by one or more compute cores, and the like. There may be more than a single load balancer and a single load monitor.

Figure 3B:
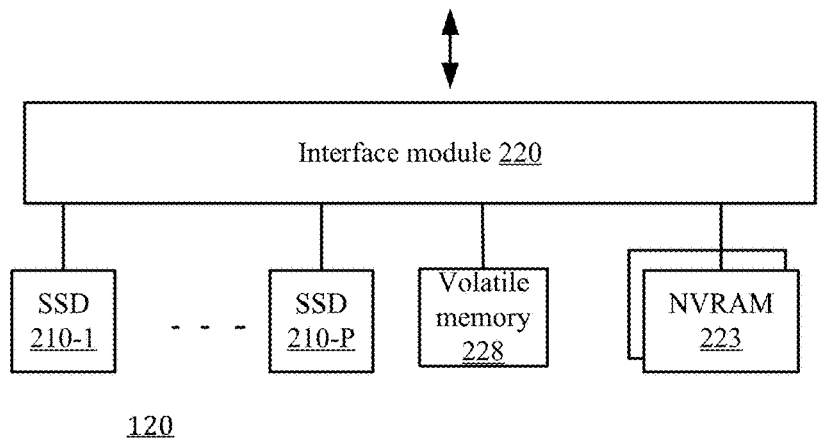
FIG. 3B is an example of a storage node.

FIG. 3B shows an example block diagram illustrating a storage node 120 according to an embodiment. The storage node 120 includes a plurality of storage devices such as SSDs 210-1 through 210-P (hereinafter referred to individually as an SSD 210 and collectively as SSDs 210, merely for simplicity purposes), at least one NVRAM, and an interface module 220.

According to the disclosed embodiments, the NVRAM 223 is utilized to reduce the number of write accesses to the SSDs 210 and the write amplification. According to an embodiment, data is written first to the NVRAM 223, which returns an acknowledgement after each such data write. Then, during a background process, the data is transferred from the NVRAM 223 to the SSDs 210. The data may kept in the NVRAM 223 until the data is completely written to the SSDs 210. Furthermore, this writing procedure ensures no data is lost when power is off.

As the NVRAM 223 supports low write latency and parallel writes, the storage node 120 supports these features. Specifically, the low latency is achieved by acknowledging the write request once the data is saved to the NVRAM 223. The parallel writes are achieved by serving multiple concurrent write requests by the NVRAM 223 and, during the background process, independently fulfilling such requests by saving the data into the SSDs 210.

Figure 3C:
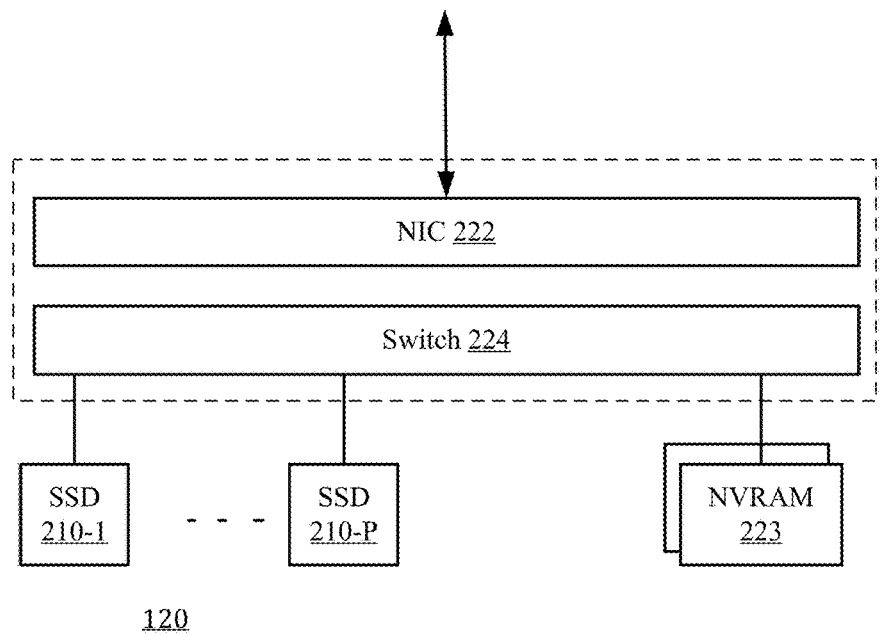
FIG. 3C is an example of an interface module of a storage node.

FIG. 3C shows an example block diagram of an interface module 220. In an example embodiment, an interface module 220 includes a network interface card (NIC) 222 and a switch 224 connected through an internal bus (not shown), e.g., a PCIe bus.

The NIC 222 allows the communication of the storage node 120 with the compute nodes (110, FIG. 3A) over the communication fabric (130, FIG. 3A). The NIC 222 may allow communication via at least one of the protocols discussed above.

The switch 224 allows the connection of the multiple SSDs 210 and NVRAM 223 to and NIC 222. In an example embodiment, the switch 224 is a PCIe switch.

In another embodiment, more than one PCIe switch is utilized to support more connectivity to the SSDs. In some configurations, where non PCIe SSDs 210 are available (e.g., Ethernet SSDs), the switch 224 may be a non PCIe switch, for example an Ethernet switch.

Figure 3D:
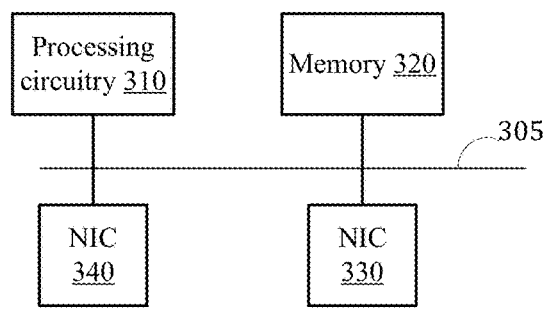
FIG. 3D is an example of a compute node.

FIG. 3D shows an example block diagram illustrating a compute node 110 according to an embodiment. The compute node 110 includes a processing circuitry 310, a memory 320, a first network interface controller (NIC) 330 and a second NIC 340. In an embodiment, the components of the compute node 110 may be communicatively connected via a bus 305.

The processing circuitry 310 may be realized as one or more hardware logic components and circuits. For example, and without limitation, illustrative types of hardware logic components that can be used include a field programmable gate array (FPGA), an Application Specific Integrated Circuit (ASIC), an Application Specific Standard Product (ASSP), a System On Chip (SOC), a general-purpose microprocessor, a microcontroller, a Digital Signal Processor (DSP), a neural network processor, and the like, or any other hardware logic components that can perform calculations or other manipulations of information.

The memory 320 may be volatile (e.g., RAM, etc.), non-volatile (e.g., ROM, flash memory, etc.), or a combination thereof. In one configuration, computer readable instructions or software to implement one or more processes performed by compute node 110 may be stored in the memory 320. Software shall be construed broadly to mean any type of instructions, whether referred to as software, firmware, middleware, microcode, hardware description language, or otherwise. Instructions may include code (e.g., in source code format, binary code format, executable code format, or any other suitable format of code).

The first NIC 330 allows the compute node 110 to communicate with the storage nodes via the communication fabric 130 (see FIG. 3A) to provide remote direct memory access to data stored in the storage nodes. In an embodiment, the first NIC 130 may enable communication via RDMA protocols such as, but not limited to, InfiniBand, RDMA over Converged Ethernet (RoCE), iWARP, and the like.

The second NIC 340 allows the compute node 110 to communicate with client devices (e.g., client device 140, FIG. 3A) through a communication network (e.g., the network 150, FIG. 3A). Examples for such a network includes, but is not limited to, the Internet, the world-wide-web (WWW), a local area network (LAN), a wide area network (WAN), and the like. It should be appreciated that in some configurations, the compute node 110 may include a single NIC. This configuration is applicable when, for example, the fabric is shared.

Replication Process Based on the Revert Process

The revert process can be used in a replication process, when one of the storage systems that participates in the replication reverts to an older version that may not exist in the other storage system anymore. According to embodiments of the invention, the storage system that executed the revert process can synchronize the other side even in cases where the other side does not include the older version and cannot restore this older version.

Replication cycles are performed on snapshots (or timelines), where a primary storage system transfers the content of the next snapshot to the secondary storage system, and the secondary system takes a snapshot at the end of the replication cycle. Typically, the secondary storage system serves as a backup system and may retain more versions than the primary storage system. The primary storage system may delete older versions that are still stored in the secondary storage system.

Figure 4:
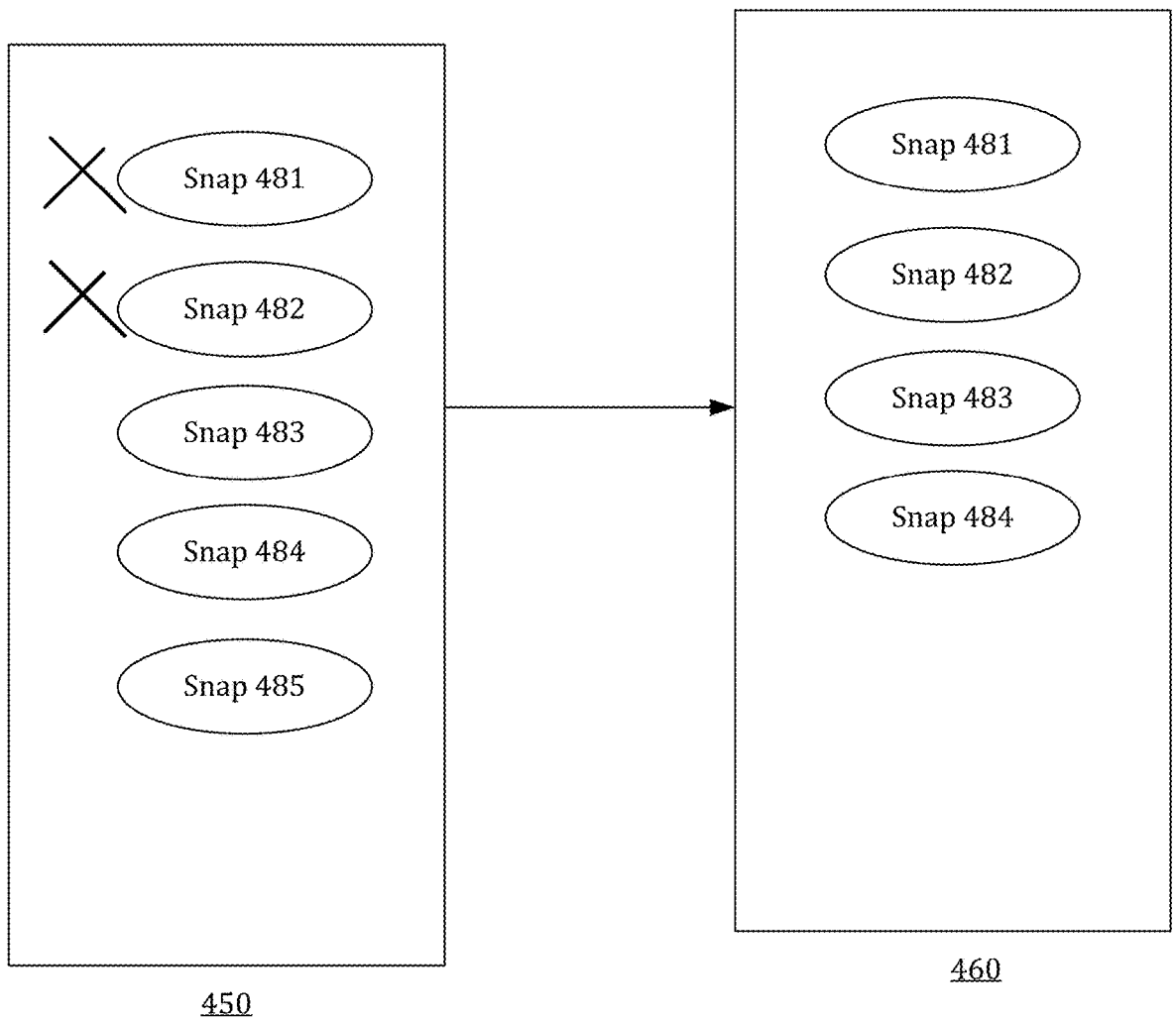
FIG. 4 is an example of a storage system and another storage system.

FIG. 4 illustrates snapshot content of primary storage system 450 and a secondary storage system 460. At the stage illustrated in FIG. 4, storage system 450 has replicated to storage system 460, data related to multiple versions, such as versions reflected by snapshots 481-484, and is in the middle of transferring data related to the next version, e.g., snapshot 485. Since the replication cycle for transferring snapshot 485 is not completed, snapshot 485 is not yet taken in storage system 460, but some of the data related to this snapshot may be already transferred and stored in the storage system 460.

Storage system 450 may delete older snapshots that were replicated to storage system 460, such as snapshots 481 and 482 of system 450 that are illustrated with a cross at the left of these snapshots to indicate deleted snapshots.

Suppose that at this stage, the replication process is stopped for various reasons, such as communication failure, failure of the primary storage system 450, failover, user command to traverse replication direction, or one of the storage systems has detected corrupted data and decided (or instructed by the administrator) to stop the replication.

Suppose storage system 460 determines (or instructed by an administrator) to revert back to a previous snapshot, e.g., snapshot 482, due to detecting malware or other data corruption in versions related to snapshots 483 and 484, or for any other reason. The decision to revert may be followed by stopping the replication process, or the need to revert may be detected after the replication has stopped.

The reverting process is performed as discussed with regard to FIGS. 1A-2. Storage system 460 may then accept write requests from users and may continue writing on top of the reverted version that is based on the previous snapshot 482.

When the replication process is to be restored, storage 460 may be required to resynchronized with storage 450 that does not include snapshot 482 (that was already deleted) and cannot perform the same revert process as was performed by storage system 460. The following steps take place in this scenario. The following steps can be also performed in other scenarios without checking whether storage 450 includes the snapshot to be reverted to.

First, in order to achieve a commonly known state, storage 450 is instructed (by e.g., storage system 460 or by an administrator) to revert to the last snapshot that was synchronized between the two systems, i.e., the last known common version, in this example, snapshot 484. By reverting to the last synchronized version, storage 450 overwrites data of any address range that may not have transferred to storage system 460 during the last non-completed cycle, in the same manner described in FIGS. 1A-2, and thus achieving a common base for continuing the process.

Once the last synchronized snapshot is restored in system 450 by using the revert process, storage system 460 sends to storage system 450 metadata and data of all the extents that were used for building the reconstructed version that is based on snapshot 482, during the revert process that was handle by storage system 460.

After storage 450 performs writing data of all the extents received from storage system 460, the working (most recent) version of both storage systems reflects the older version 482.

In addition, storage system 460 may transfer any update that was written by storage system 460 after it reverted to snapshot 482.

The described snapshots may represent the versions described for FIGS. 1A-2. The terms snapshot and version may be used interchangeably.

Figure 5:
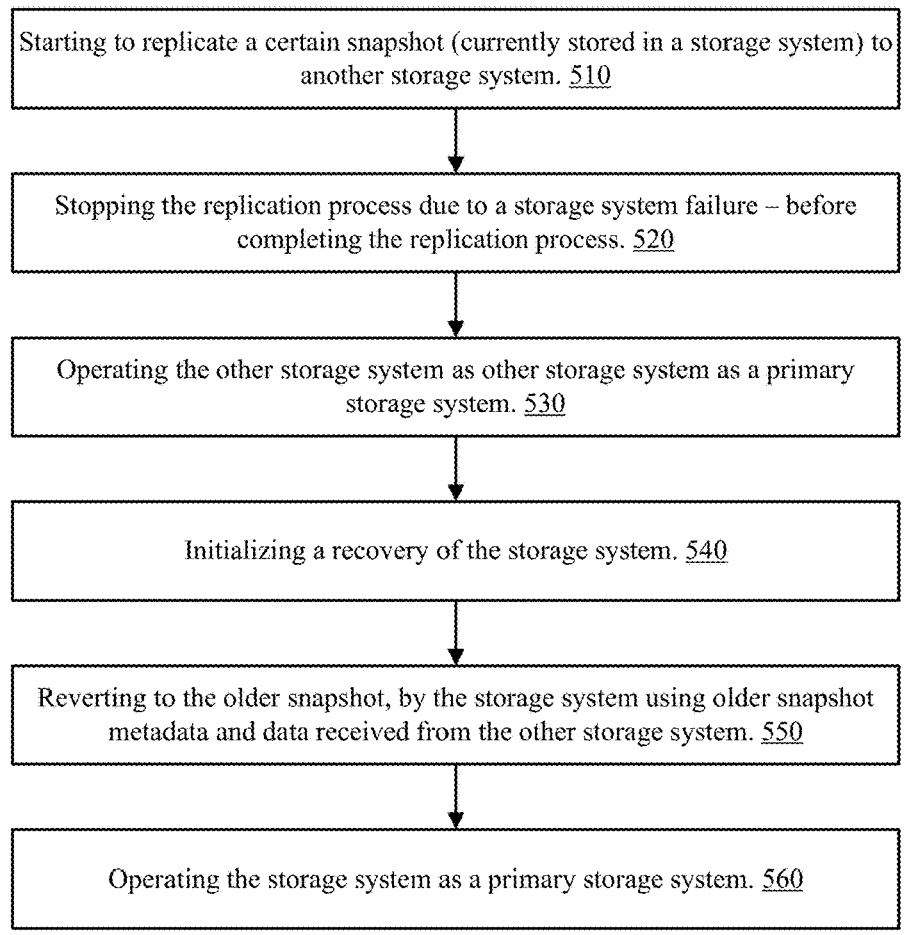
FIG. 5 is an example of a method.

FIG. 5 illustrates an example of method 500 for snapshot reversion.

Method 500 may start by step 510 of starting to replicate a certain snapshot (currently stored in a storage system) to another storage system. The storage system may operate as a primary storage system and is in communication with computerized entities that are coupled to the storage system and may send it access requests, including write requests with data to be stored and replicated to the other storage system.

At this point of time the other storage system stores an older snapshot (such as older snapshots 481 and 482 of FIG. 4) not stored in the storage system. The other storage system may store multiple older snapshots associated with different points in time. The older snapshot refers to a snapshot that is older than the oldest snapshot stored in the primary storage system, or in other words, was created before the time of any snapshot stored in the primary storage system.

Step 510 may be followed by step 520 of stopping the replication process due to a storage system failure—before completing the replication process. The certain snapshot is now referred to as a failed replication snapshot. The failure may cause the storage system to stop operating as a primary storage system. This role (primary storage system) may be taken by the other storage system.

Step 520 may be followed by step 530 of operating the other storage system as a primary storage system—although any storage system that differs from the (currently failed) storage system can take this role.

Step 530 may be followed by step 540 of initializing a recovery of the storage system. Wherein the recovery is aided by the other storage system—that may send older snapshot metadata and data received to the storage system.

Step 540 may be followed by step 550 of reverting to the older snapshot, by the storage system using older snapshot metadata and data received from the other storage system.

Step 550 may be followed by step 560 of operating the storage system as a primary storage system.

Figure 6:
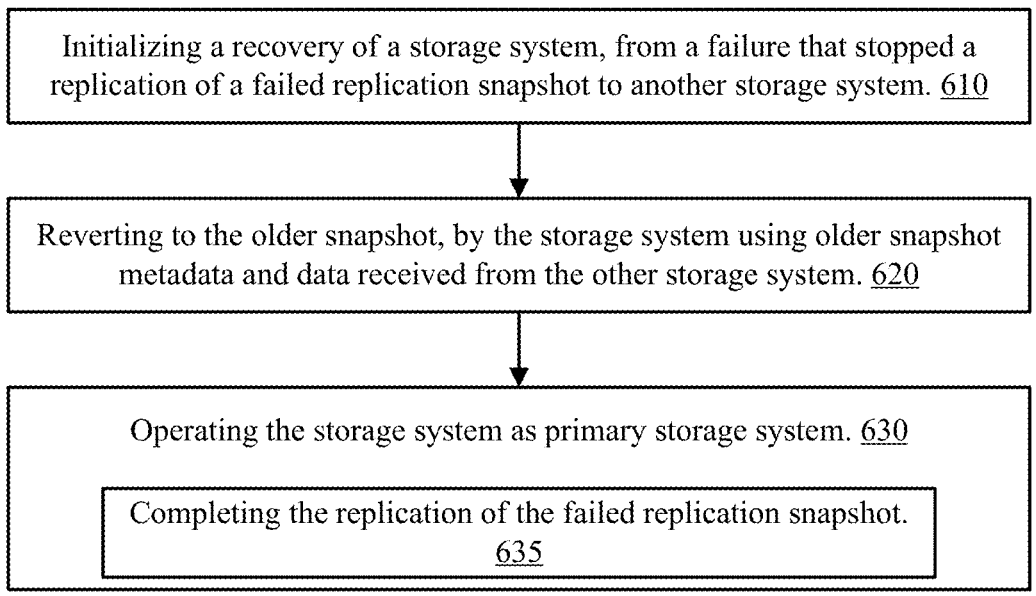
FIG. 6 is an example of a method.

FIG. 6 illustrates an example of method 600 for snapshot reversion.

Method 600 may start by step 610 of initializing a recovery of a storage system, from a failure that stopped a replication of a failed replication snapshot to another storage system. The other storage system reverted to an older snapshot not stored in the storage system.

Step 610 may be followed by step 620 of reverting to the older snapshot, by the storage system using older snapshot metadata and data received from the other storage system.

The older snapshot metadata may include one or more snapshot segments, such as reconstructed version segments that were produced by the other storage system, as described in FIGS. 1A-2. The older snapshot data may further include a non-existing indication for a snapshot segment that existed in a snapshot that followed the older snapshot and not exists at the older snapshot. The data may include one or more older snapshot segments that corresponds to segments that were overwritten by intermediate snapshots, i.e., snapshots that followed the older snapshot.

The reverting to the older snapshot is executed without undoing changes that were made since the older snapshot.

Step 620 may include executing any part of method 10. It should be noted that the reverting may also include receiving data from the other storage system—as the storage system does not store already such data.

Step 620 may be followed by step 630 of operating the storage system as a primary storage system. This is conditioned by a successful completion of the reverting to the older snapshot.

Step 630 may include step 635 of completing the replication of the failed replication snapshot.

Figure 7:
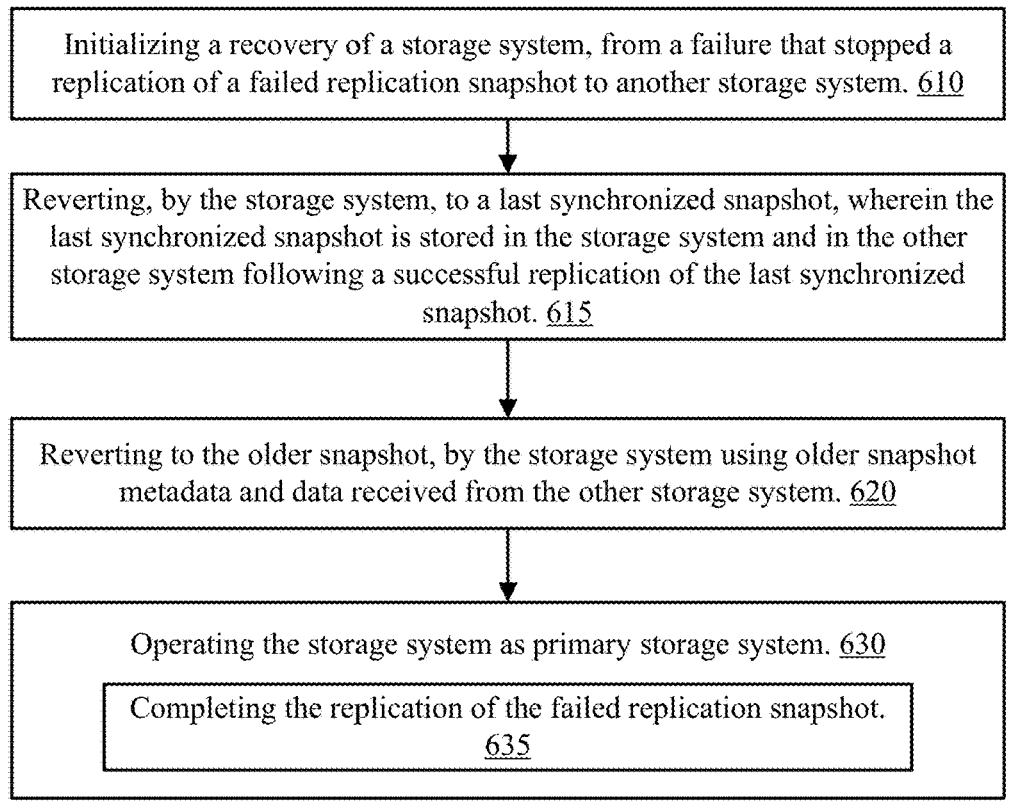
FIG. 7 is an example of a method.

FIG. 7 illustrates an example of method 700 for snapshot reversion.

Method 700 differs from method 600 by including step 615 of reverting, by the storage system, to a last synchronized snapshot, wherein the last synchronized snapshot is a last snapshot (last—from a point of time view point) stored in the storage system and in the other storage system. Step 615 may ease the completion of method 700.

Step 615 may follow step 610 and may be followed by step 620.

Step 615 may include utilizing last synchronized snapshot fallback retrieval metadata that comprises a non-existing last synchronized snapshot segment indicator that indicates that the non-existing last synchronized snapshot segment does not exist, wherein the non-existing last synchronized snapshot segment does not exist when a corresponding segment does not exist in any snapshot that precedes the last synchronized snapshot and is stored in the storage system. The non-existing last synchronized snapshot segment may be generated regardless of a presence of a corresponding segment in any snapshot that follows the last synchronized snapshot.

Step 615 may include executing any part of method 10.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for snapshot reversion, the method comprising:
   initializing a recovery of a storage system, from a failure that stopped a replication of a failed replication snapshot to an other storage system; wherein the other storage system reverted to an older snapshot not stored in the storage system; and
   reverting to the older snapshot, by the storage system using older snapshot metadata and data received from the other storage system; wherein the older snapshot data comprises a non-existing indication for a snapshot segment that existed in a snapshot that followed the older snapshot and not exists at the older snapshot, and wherein the data comprises one or more older snapshot segments; wherein the reverting to the older snapshot is executed without undoing changes that were made since the older snapshot.

2. The method according to claim 1 comprising operating the storage system as a primary storage system following a successful completion of the reverting to the older snapshot.

3. The method according to claim 2 wherein the operating of the storage system as the primary storage system comprises completing the replication of the failed replication snapshot.

4. The method according to claim 1 comprising reverting, by the storage system, to a last synchronized snapshot, wherein the last synchronized snapshot is stored in the storage system and in the other storage system following a successful replication of the last synchronized snapshot.

5. The method according to claim 4 wherein the reverting to the last synchronized snapshot comprises utilizing last synchronized snapshot fallback retrieval metadata that comprises a non-existing last synchronized snapshot segment indicator that indicates that the non-existing last synchronized snapshot segment does not exist, wherein the non-existing last synchronized snapshot segment does not exist when a corresponding segment does not exist in any snapshot that precedes the last synchronized snapshot and is stored in the storage system; wherein the non-existing last synchronized snapshot segment is generated regardless of a presence of a corresponding segment in any snapshot that follows the last synchronized snapshot.

6. A non-transitory computer readable medium for snapshot reversion, the non-transitory computer readable medium stores instructions for:
   initializing a recovery of a storage system, from a failure that stopped a replication of a failed replication snapshot to an other storage system; wherein the other storage system reverted to an older snapshot not stored in the storage system; and
   reverting to the older snapshot, by the storage system using older snapshot metadata and data received from the other storage system; wherein the older snapshot data comprises a non-existing indication for a snapshot segment that existed in a snapshot that followed the older snapshot and not exists at the older snapshot, and wherein the data comprises one or more older snapshot segments; wherein the reverting to the older snapshot is executed without undoing changes that were made since the older snapshot.

7. The non-transitory computer readable medium according to claim 6 that stores instructions for operating the storage system as a primary storage system following a successful completion of the reverting to the older snapshot.

8. The non-transitory computer readable medium according to claim 7 wherein the operating of the storage system as the primary storage system comprises completing the replication of the failed replication snapshot.

9. The non-transitory computer readable medium according to claim 6 that stores instructions for reverting, by the storage system, to a last synchronized snapshot, wherein the last synchronized snapshot is stored in the storage system and in the other storage system following a successful replication of the last synchronized snapshot.

10. The non-transitory computer readable medium according to claim 9 wherein the reverting to the last synchronized snapshot comprises utilizing last synchronized snapshot fallback retrieval metadata that comprises a non-existing last synchronized snapshot segment indicator that indicates that the non-existing last synchronized snapshot segment does not exist, wherein the non-existing last synchronized snapshot segment does not exist when a corresponding segment does not exist in any snapshot that precedes the last synchronized snapshot and is stored in the storage system; wherein the non-existing last synchronized snapshot segment is generated regardless of a presence of a corresponding segment in any snapshot that follows the last synchronized snapshot.

11. A storage system that comprising at least one processing circuitry that is configured to:
   initialize a recovery of the storage system, from a failure that stopped a replication of a failed replication snapshot to an other storage system; wherein the other storage system reverted to an older snapshot not stored in the storage system; and
   revert to the older snapshot using older snapshot metadata and data received from the other storage system; wherein the older snapshot data comprises a non-existing indication for a snapshot segment that existed in a snapshot that followed the older snapshot and not exists at the older snapshot, and wherein the data comprises one or more older snapshot segments; wherein the reverting to the older snapshot is executed without undoing changes that were made since the older snapshot.

12. The storage system according to claim 11 that is configured to operate the storage system as a primary storage system following a successful completion of the reverting to the older snapshot.

13. The storage system according to claim 12 wherein an operating of the storage system as the primary storage system comprises completing the replication of the failed replication snapshot.

14. The storage system according to claim 11 comprising reverting, by the storage system, to a last synchronized snapshot, wherein the last synchronized snapshot is stored in the storage system and in the other storage system following a successful replication of the last synchronized snapshot.

15. The storage system according to claim 14 wherein the reverting to the last synchronized snapshot comprises utilizing last synchronized snapshot fallback retrieval metadata that comprises a non-existing last synchronized snapshot segment indicator that indicates that the non-existing last synchronized snapshot segment does not exist, wherein the non-existing last synchronized snapshot segment does not exist when a corresponding segment does not exist in any snapshot that precedes the last synchronized snapshot and is stored in the storage system; wherein the non-existing last synchronized snapshot segment is generated regardless of a presence of a corresponding segment in any snapshot that follows the last synchronized snapshot.

* * * * *